United States Patent [19]

Wight et al.

[11] Patent Number: 4,602,772

[45] Date of Patent: Jul. 29, 1986

[54] REPLACEABLE VISE JAW INSERT ASSEMBLY

[76] Inventors: Stanley W. Wight, 16376 Camellia Ter., Los Gatos, Calif. 95030; Larry L. Horn, 1615 Pam La., San Jose, Calif. 95120

[21] Appl. No.: 712,125

[22] Filed: Mar. 15, 1985

[51] Int. Cl.[4] .......... B23Q 3/02

[52] U.S. Cl. .......... 269/282

[58] Field of Search .......... 269/282, 283, 136; 81/180 R-180 D

[56] References Cited

U.S. PATENT DOCUMENTS

| | | | |
|---|---|---|---|
| 3,785,635 | 1/1974 | Lassy et al. | 269/136 |
| 4,078,782 | 3/1978 | Carlson | 269/283 |
| 4,251,066 | 2/1981 | Bowling | 269/283 |
| 4,437,654 | 3/1984 | Chiappetti | 269/283 |

*Primary Examiner*—Robert C. Watson

*Attorney, Agent, or Firm*—Robert Charles Hill

[57] ABSTRACT

A replaceable vise jaw insert assembly is disclosed for mounting on either the fixed or movable vise jaw of a mill vise or the like. The vise jaw insert assembly includes a clamping member adapted for attachment to one of the vise jaws of the mill vise, preferably by two threaded members. Facing surfaces of the clamping member and vise jaw are spaced apart and inclined relatively toward each other. An insert member having a wedge-shaped portion configured for generally mating engagement with the facing surfaces of the clamping member and vise jaw causes the wedge-shaped portion of the insert member to be captured therebetween. The insert member is also formed with a gripping surface for securing a workpiece on the mill vise. The insert member is preferably an extruded member, the gripping surface and wedge-shaped portion of the insert body being extrusion formed.

20 Claims, 6 Drawing Figures

REPLACEABLE VISE JAW INSERT ASSEMBLY

BACKGROUND OF THE INVENTION

The present invention relates to a vise jaw insert for mill vises and the like and, more particularly, to a vise jaw insert assembly adapted for use in such tools for facilitating installation or replacement of gripping surfaces formed on the vise jaws.

Mill vises are employed in many different machine tools such as milling machines, shapers and drill presses for providing a gripping surface to secure a workpiece in place upon the machine. Mill vises commonly have a stationary vise jaw and a movable vise jaw, for example, mounted in opposition to each other. Inserts are replaceably mounted upon each of the vise jaws for gripping a workpiece therebetween as the movable vise jaw is shifted toward the fixed vise jaw.

Such inserts may, for example, be formed from hardened steel or alloy compositions in order to permit their continued use over long periods of time. However, the inserts may also be formed from relatively soft metals such as aluminum or aluminum alloys, for example. The soft inserts are commonly used where it is desired to provide a particular gripping configuration on the face of the insert. For example, grooves or channels are commonly cut along the face or along one edge thereof in order to better adapt the insert to a particular workpiece being secured by the mill vise.

Examples of tools including replaceable vise jaw inserts in the prior art are set forth in U.S. Pat. No. 4,291,870 issued to Warde on Sept. 29, 1981 and French patent No. 59,161 published on May 6, 1954. These references are typical of prior art machines or tools having relatively movable vise jaws or members to which replaceable inserts are attached for forming gripping surfaces to secure a workpiece in place. Such inserts have also been provided with offset enlarged passages to permit replacement thereof without removal of the threaded bolts securing them to the jaws.

In normal machine shop operations, mill vises and the like commonly require a substantial member and relatively wide variety of different inserts in order to adapt the machines for use with various workpieces. Accordingly, the inserts are designed to be replaceable upon the relatively movable vise jaws of the mill vise.

A common technique employed in the past for replaceably securing the insert upon the vise jaws was to provide counterbored openings passing through the insert for register with threaded holes in the respective vise jaw. With such an arrangement, a cap screw or other threaded member could be placed in each of the counterbored openings of the insert and threaded into the vise jaw for securing the insert in place.

However, it has been found that the need for frequently replacing the inserts in such mill vises has required substantial time, particularly over an entire working shift. With a prior art design of the type described immediately above, replacement of the insert or inserts in the mill vise required that the vise jaws be moved sufficiently far apart in order to permit access to the screws. Furthermore, the screws had to be completely unthreaded from the vise jaws and actually removed from the insert in order to permit the insert to be replaced. The screws then had to again be passed through the replacement inserts and completely rethreaded into engagement with the respective vise jaw.

This operation was time consuming and tended to contribute to inefficiency of the machine shop operation. Such operation tended to particularly be inefficient if selected operations were frequently repeated, for example, with it being necessary to replace the insert or inserts several times during a working shift.

In addition, the relative complexity of the inserts and the need for inserts of many different designs tended to also add undesirably to the cost of the milling operation.

Accordingly, there has been found to remain a need for a vise jaw insert capable of overcoming one or more problems of the type outlined above. In particular, there has been found to be a need for such an insert which can be rapidly replaced upon the vise jaw or vise jaws of a mill vise.

SUMMARY OF THE INVENTION

It is therefore an object of the invention to provide an improved vise jaw insert assembly capable of facilitating installation, removal and replacement of the insert in a mill vise or the like.

More particularly, it is an object of the invention to provide such a vise jaw insert which is adapted for replaceable mounting on a vise jaw of a mill vise or the like by attachment means such as screws, the insert of the invention being adapted for removal and/or replacement, for example, of the insert without the need to entirely remove the attachment means or screws in order to further facilitate the replacement or interchange of inserts in the mill vise.

It is a further object of the invention to provide a replaceable vise jaw insert assembly for mounting an insert on a vise jaw arranged on a base portion of a mill vise or the like, the vise jaw insert assembly including a clamping member adapted for attachment to the vise jaw by two threaded members, the vise jaw and clamping member being formed with facing surfaces extending outwardly and toward each other from the base portion of the mill vise and an insert member having a wedge-shaped portion configured for generally mating engagement with the facing surfaces of the clamping member and vise jaw in order to capture the insert member between the clamping member and the vise jaw, the insert member being formed with a gripping surface for securing a workpiece on the mill vise.

It is yet another object of the invention to provide a replaceable vise jaw insert assembly for mounting of an insert on a vise jaw of a mill vise or the like, the insert assembly comprising a clamping member adapted for attachment to the vise jaw with facing surfaces of the clamping member and vise jaw being spaced apart and inclined relatively towards each other, an insert member configured as described immediately above being provided for capture between the facing surfaces of the vise jaw and clamping member.

Yet another object of the invention is to provide an insert adapted for replaceable mounting on a mill vise or the like between a vise jaw and clamping member as generally described above, the insert member comprising a wedge-shaped portion configured for generally mating engagement between the spaced apart and relatively inclined facing surfaces of the vise jaw and clamping member, the insert member also comprising a portion arranged to overlap the clamping member, the overlapping portion of the insert member forming a gripping surface for securing a workpiece on the mill vise.

It is yet another related object of the invention to provide an insert body or vise jaw insert assembly as described above wherein the insert body includes portions overlapping of the vise jaw and clamping member in order to provide greater rigidity for the insert member in the assembly.

Yet another related object of the invention is to provide such an insert member or vise jaw insert assembly wherein the insert member is an extruded piece, the wedge-shaped portion and gripping surface of the insert member being formed by extrusion to simplify formation of the insert or even a number of different insert configurations. By forming the insert member through extrusion, the extruded insert member may then be cut off to any selected length, transverse slotted openings preferably being formed in the insert member to receive connecting means or threaded fasteners for securing the clamping means to the vise jaw. Through such an arrangement, the interaction of the fastening means or threaded connectors with the slotted openings prevent lateral movement of the insert member between the vise jaw and the clamping member.

Additional objects and advantages of the present invention are made apparent in the following description having reference to the accompanying drawings.

Figure 1:
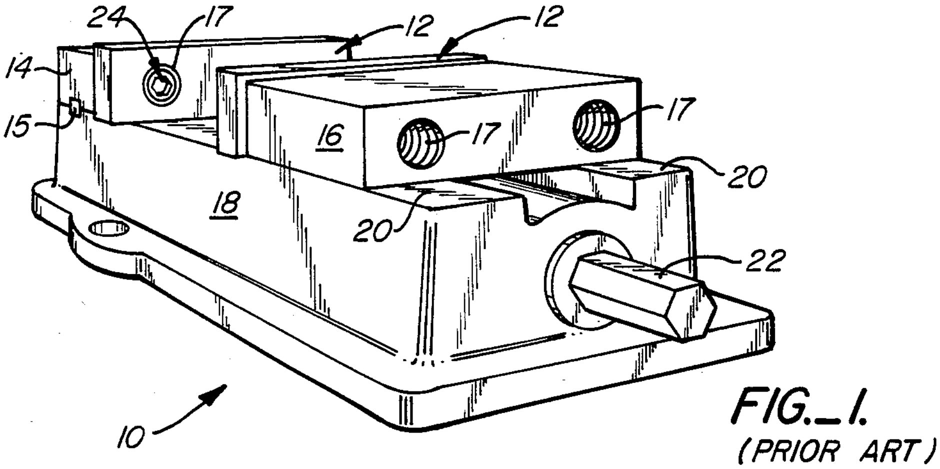
FIG. 1. (PRIOR ART)
FIG. 1 is an isometric view of a generally conventional mill vise of the type adapted for use with replaceable inserts on its vise jaws.
Figure 2:
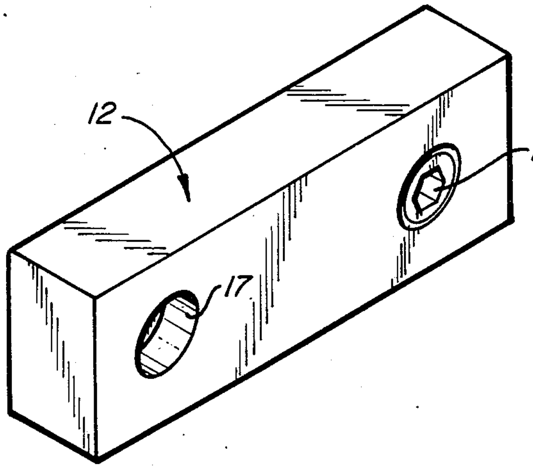
FIG. 2. (PRIOR ART)
FIG. 2 is a perspective view of a replaceable insert adapted for attachment to one of the vise jaws in the mill vise of FIG. 1.

The mill vise illustrated in FIG. 1 and the replaceable insert illustrated in FIG. 2 for use with such a mill vise are both representative of the prior art.

Figure 3:
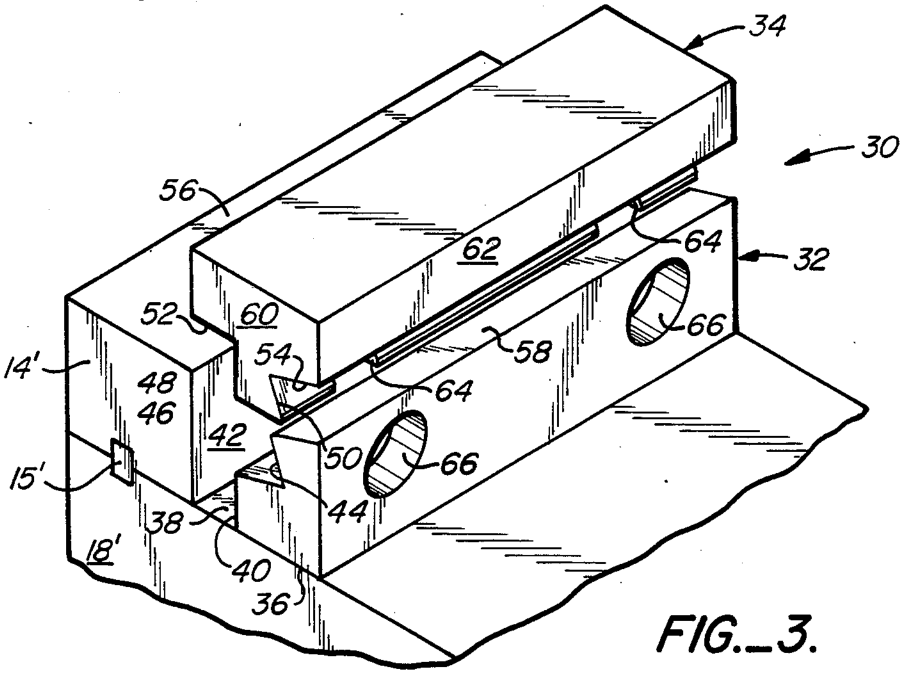

FIG. 3 is an exploded view of a vise jaw insert assembly in accordance with the present invention, the vise jaw insert assembly further being shown in conjunction with a vise jaw of the type used in a mill vise such as shown in FIG. 1.

Figure 4:
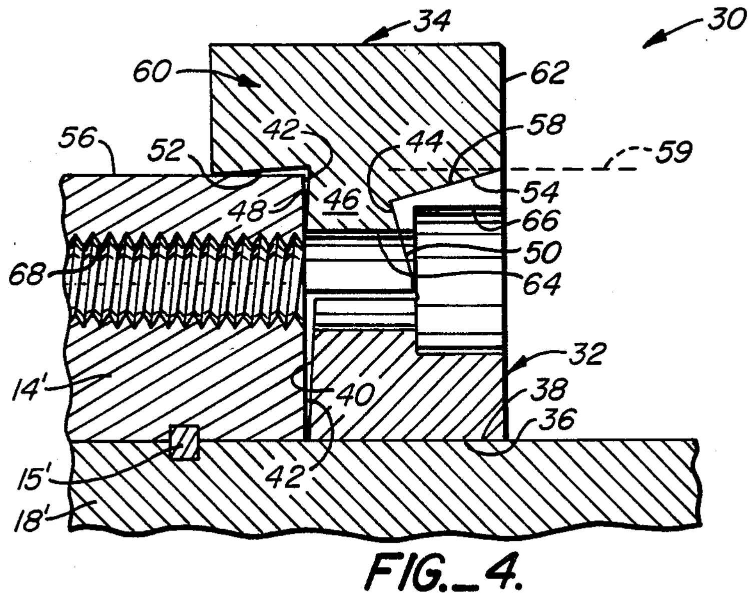
Figure 5:
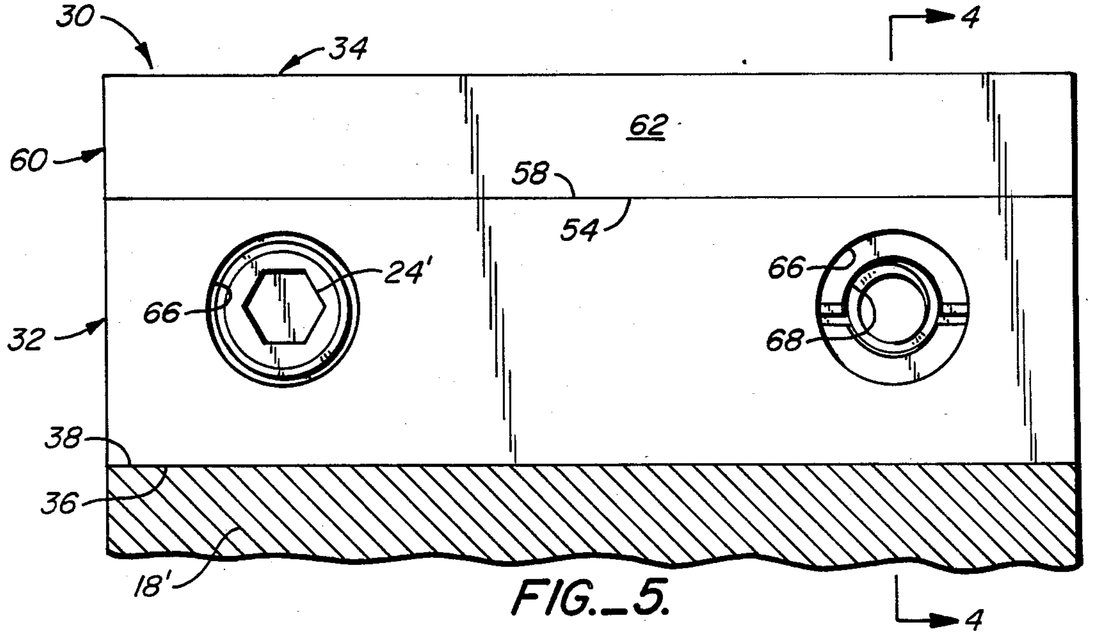

FIG. 4 is a sectional view taken substantially as indicated along line 4—4 of FIG. 5.

FIG. 5 is a front view of FIG. 3 with the components being assembled together in interlocking relation.

Figure 6:
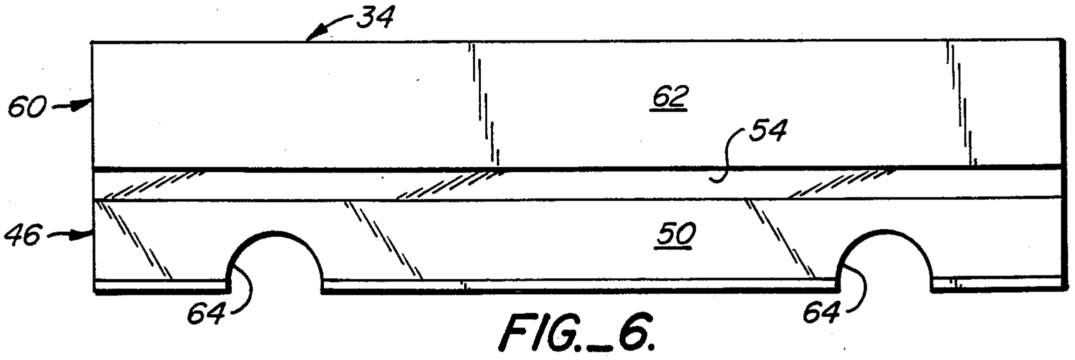

FIG. 6 is a front view showing the replaceable insert of the vise jaw insert assembly of the present invention.

DESCRIPTION OF THE PREFERRED EMBODIMENT

A vise jaw insert assembly constructed in accordance with the present invention is generally illustrated in FIGS. 3–6. However, before describing the vise jaw insert assembly of the present invention, reference is first made to FIGS. 1 and 2 illustrating a mill vise 10 with replaceable inserts 12 as described in greater detail below.

Referring in particular to FIG. 1, the mill vise 10 is illustrated with similar vise jaw inserts 12 being mounted in facing opposition to each other upon a stationary vise jaw 14 and a movable vise jaw 16, respectively.

As is illustrated in FIG. 1, the construction of the mill vise 10 and vise jaws 14 and 16 is of conventional construction. The mill vise 10 includes a base 18 upon which the stationary vise jaw 14 is mounted and secured, for example, by means of a key member 15. The movable vise jaw 16 is supported on ways 20 and is conventionally shifted toward and away from the stationary vise jaw 14 by means of a lead vise screw 22. The manner in which the vise screw 22 is interconnected with the movable vise jaw 16 is omitted from FIG. 1 for purposes of simplicity but is understood to be of conventional construction in accordance with the prior art.

Each of the prior art inserts 12 is secured to one of the vise jaws 14 and 16 by means of hollow-head cap screws indicated at 24 in FIGS. 1 and 2. In FIG. 2, a cap screw 24 is illustrated in the opening at the right end of the insert 12. However, a similar cap screw is omitted from the left end of the insert in order to illustrate a counterbored opening 17 formed in the insert for receiving the cap screw 24. It is to be understood that in the prior art configuration of FIGS. 1 and 2, a counterbored opening such as that illustrated at 17 is formed in each end of the insert with a cap screw such as that indicated at 24 being arranged in both of the counterbored openings to secure the insert to a vise jaw, for example the fixed vise jaw 14 in FIG. 1.

Referring again to the preceding description of prior art inserts employed within mill vises such as that illustrated at 10 in FIG. 1, it was previously necessary to shift the movable vise jaw 16 sufficiently apart from the stationary vise jaw 14 in order to provide access to the screws 24 and also to permit them to be entirely unthreaded from the supporting vise jaw and removed from the counterbored opening 17 in the insert. Thus, the replacement or interchange of inserts on such a mill vise was relatively time consuming and inefficient in the prior art.

By contrast, the vise jaw insert assembly of the present invention as illustrated and described below in connection with FIGS. 3–6 is particularly adapted for facilitating replacement or interchange of inserts upon a supporting vise jaw such as the stationary vise jaw 14 or movable vise jaw 16 in FIG. 1. Accordingly, the construction of the vise jaw insert assembly of the present invention is described immediately below followed by a brief description of the manner in which an insert employed within the vise jaw insert assembly is replaced upon the mill vise 10 of FIG. 1.

Referring in combination to FIGS. 3–5, the vise jaw insert assembly of the present invention is generally indicated at 30. The assembly 30 includes a clamping member 32 adapted for attachment to a vise jaw such as that indicated at 14' by attachment means such as threaded screws of the type indicated at 24 in FIGS. 1 and 2 and 24' in FIG. 5. The insert assembly 30 also includes an insert member 34 which is adapted to be captured between the clamping member 32 and the vise jaw 14' in a manner described in greater detail below. In any event, the vise jaw insert assembly 30 of the present invention permits greatly simplified configuration and construction of the insert member 34 while greatly facilitating its installation or replacement upon the vise jaw 14' in accordance with the present invention. As will be described in greater detail below, it is only necessary to slightly shift the clamping member 32 away from the vise jaw, for example, by loosening the cap screws 24' in order to install an insert or to remove an insert and replace it with another. Thereafter, the insert may be rigidly clamped in place simply by shifting the clamping member 32 toward the vise jaw 14' by, again, tightening the cap screws 24'.

In each of FIGS. 3–5, portions of a mill vise are illustrated in fragment, those fragmentary portions on the mill vise being indicated by primed numerals corresponding to numerals employed for the mill vise of FIG. 1.

Referring again particularly to FIGS. 3-5, the clamping member 32 is formed with a base surface 36 for resting on a surface 38 of the base portion of the mill vise. A vertical surface 40 on the clamping member is adapted to engage and mate with a forward surface 42 on the fixed vise jaw 14'.

The forward surface 42 of the vise jaw 14' extends further upwardly into facing relation with a facing surface 44 on the clamping member 32. As may be best seen in FIG. 4, the facing surfaces 42 and 44 are arranged in spaced apart relation within the insert assembly 30, the surfaces 42 and 44 extending upwardly and toward each other relative to the surface 38 of the base portion of the mill vise. As will be more apparent from the following description, the facing surfaces 42 and 44 provide a means for capturing and securing in place the insert member 34.

Referring to all of FIGS. 3-6, the insert member 34 is formed with a wedge-shaped portion 46 having opposite surfaces 48 and 50 adapted to mate with and engage the facing surfaces 42 and 44. Thus, when the clamping member 32 is shifted toward and secured to the vise jaw 14', as illustrated in FIG. 4, the wedge-shaped portion 46 of the insert member 34 is securely captured between the facing surfaces 42 and 44. In addition, the insert member 34 is formed with surfaces 52 and 54 extending respectively rearwardly and forwardly from the wedge-shaped portion 46, surface 54 being substantially perpendicular to surface 50. The surface 52 abuts and mates with the upper surface 56 of the vise jaw 14'. The forwardly extending surface 54 similarly abuts and mates with the upper surface 58 of the clamping member 32. As seen in FIG. 4, surface 54 is inclined about 15° below horizontal reference line 59.

Continuing with reference to FIG. 4, it may be seen that a portion 60 of the insert member 34 above the surface 54 overlaps the clamping member 32 and forms a gripping surface 62. As may also be seen in FIG. 4, with the insert member 34 secured in place, the gripping surface 62 extends forwardly from the vise jaw 14' for engaging a workpiece (not shown).

The overlapping surfaces 52 and 54 serve to further rigidify positioning of the insert member 34 relative to the vise jaw 14'. For example, during use in a mill vise of the type illustrated in FIG. 1, substantial force is applied to the gripping surface 62. That force will tend to rotate the insert member 34 in counterclockwise fashion as viewed in FIG. 4. As was noted above, that force is initially resisted by engagement of the wedge-shaped portion 46 of the insert member 34 between the surfaces 42 and 44. In addition, the force is substantially resisted by interaction of the surface 52 of the insert member directly upon the vise jaw 14'.

As noted above, the surfaces 42 and 44 taper upwardly and toward each other. Preferably, that taper or inclination is formed by the surface 44 on the clamping member so that the surface 44 extends over a portion of the wedge-shaped portion 46 of the insert member. That arrangement has been found to better resist the counterclockwise force applied to the insert member 34 as described above.

In accordance with the preceding description, the insert member 34 is securely captured between the vise jaw 14' and clamping member 32 as described above. In order to further assure against any movement of the insert member 34, it is also formed with slotted openings 64 in register with openings 66 formed in the clamping member 32 for receiving threaded fasteners such as that indicated at 24' in FIG. 5. Thus, as the threaded screws 24' extend between the clamping member 32 and vise jaw 14', they pass through the slotted openings 64 in order to prevent lateral movement of the insert member 34. At the same time, with the openings 64 being slotted as illustrated in FIG. 6, the insert member 34 may readily be removed from the insert assembly 30 in order to further facilitate replacement of an insert.

It is particularly to be noted, as may be best seen in FIGS. 4 and 6, that the insert member 34 is formed substantially with surfaces extending in continuous lateral fashion along the length of the insert member 34. For example, the surfaces 48 and 50 forming the wedge-shaped portion 46 have at least one axis parallel with the gripping surface 62. Accordingly, the insert member 34 of the present invention is particularly adapted to facilitate its manufacture as an extruded member with all of those surfaces being formed by extrusion. It may also be seen from FIG. 4 that the overlapping surfaces 52 and 54 may also be formed by extrusion of the insert member 34.

Thus, each configuration of insert member 34 may be readily formed by extrusion, the extrusions being cut off as desired to establish the length of the insert member 34. Thus, the only operation necessary in addition to extrusion and cut-off of the insert member 34 is the simple cross drilling or formation of the slotted openings 64.

Thus, the insert member 34 of the present invention offers a number of advantages. In addition to facilitating its installation or replacement on a vise jaw such as that indicated at 14', it is formed in a particularly simple manner to reduce its cost. At the same time, a minimum amount of material is employed because of the intermeshing relation of the insert member 34 with the clamping member 32 and vise jaw 14'. Also because of the interlocking relation of the insert member 34 with the clamping member 32 and vise jaw 14', the insert assembly 30 provides for very rigid entrapment and positioning of the insert member 34 relative to the vise jaw 14' and the base portion 18' of the mill vise.

Referring further to FIG. 4, it is also noted that, as in the prior art, the vise jaw 14' is formed with threaded openings 68 in register with the counterbored openings 66 for receiving the cap screws 24'.

It is believed that the method of use and replacement of portions of the insert assembly 30 in accordance with the present invention is apparent from the preceding description. However, the installation of the insert assembly 30 and replacement of the insert member 34 is briefly described below in order to assure a complete understanding of the invention.

Initially, with the clamping member 32 positioned slightly apart from the vise jaw 14' as illustrated, for example, in FIG. 3, the wedge-shaped portion 46 of the insert member 34 may be positioned between the surfaces 42 and 44 of the vise jaw 14' and clamping member 32, respectively. With the insert member 34 positioned downwardly so that its surfaces 52 and 54 are in engagement, respectively, with the vise jaw 14' and clamping member 32, the clamping member 32 is then shifted toward the vise jaw 14' to ensure mating engagement of the surfaces 42 and 44 with the surfaces 48 and 50 of the wedge-shaped portion 46 of the insert member 34. With those components so assembled, the cap screws 24' are then passed through the counterbored openings 66, the slotted openings 64 for engagement with the threaded openings 68 in the vise jaw 14'. With the insert assembly so constructed, the insert member 34 is rigidly secured so that the gripping surface 62 may be used to advantage within the mill vise.

When it is necessary or desirable to exchange or replace the insert member 34, it is only necessary to loosen the screws 24' sufficient to shift the clamping member 32 slightly away from the vise jaw 14' to permit removal of the insert member 34. Thereafter, another insert member of similar or different configuration but, in any event, having a similarly configured wedge-shaped portion 46 may then be arranged between the vise jaw 14' and the clamping member 32 in the same manner described above.

Accordingly, there has been described an effective vise jaw insert assembly adapted for replaceable mounting on either a fixed or movable vise jaw as illustrated in the mill vise 10 of FIG. 1. Various modifications in addition to those specifically set forth above are believed obvious within the insert assembly described above. Accordingly, the scope of the present invention is defined only by the following appended claims.

What is claimed is:

1. A replaceable vise jaw insert assembly adapted for mounting on a vise jaw of a mill vise or the like, comprising a clamping member adapted for attachment to the vise jaw by attachment means with facing surfaces of the clamping member and vise jaw being spaced apart and inclined relatively toward each other, and an insert member having a wedge-shaped portion configured for generally mating engagement with the facing surfaces of the clamping member and vise jaw to provide for capture of the wedge-shaped portion between the clamping member and vise jaw, the insert member being formed with a gripping surface for securing a workpiece on the mill vise.

2. The replaceable vise jaw insert assembly of claim 1 further comprising means for attaching the clamping member to the vise jaw, the attaching means being adapted for loosening to permit installation or removal of the insert member and for tightening to secure the wedge-shaped portion of the insert member in place between the vise jaw and the clamping member.

3. The replaceable vise jaw insert assembly of claim 2 wherein the attaching means comprises at least one threaded member passing through an opening in one of the clamping member and vise jaw and threadedly engaging the other of the clamping member and vise jaw.

4. The replaceable vise jaw insert assembly of claim 3 wherein the facing surfaces of the clamping member and vise jaw incline upwardly and toward each other relative to a base surface portion of the mill vise.

5. The replaceable vise jaw insert assembly of claim 4 wherein the facing surface of the vise jaw is generally perpendicular to an adjacent surface of the mill vise, the facing surface of the clamping member being inclined toward the facing surface of the vise jaw.

6. The replaceable vise jaw insert assembly of claim 4 further comprising a plurality of threaded members passing between the facing surfaces of the clamping member and vise jaw and through respective slotted openings in the insert member to prevent lateral movement of the insert member between the facing surfaces.

7. The replaceable vise jaw insert assembly of claim 6 wherein the insert member has surfaces which overlap and generally mate with surfaces on the clamping member and vise jaw opposite the base portion of the mill vise.

8. The replaceable vise jaw insert assembly of claim 7 wherein the insert member is extruded, the gripping surface and wedge-shaped portion of the insert body being formed by extrusion.

9. The replaceable vise jaw insert assembly of claim 8 wherein the extruded insert member is cut to a predetermined length with slotted openings being formed in the insert body transverse to its axis of extrusion for receiving the threaded members whereby the threaded members prevent lateral movement of the insert member.

10. The replaceable vise jaw insert assembly of claim 1 wherein the facing surfaces of the clamping member and vise jaw incline upwardly and toward each other relative to a base surface portion of the mill vise.

11. The replaceable jaw insert assembly of claim 10 wherein the insert member is extruded, the gripping surface and wedge-shaped portion of the insert member being formed by extrusion.

12. The replaceable vise jaw insert assembly of claim 10 further comprising a plurality of threaded members passing between the facing surfaces of the clamping member and vise jaw and through respective slotted openings in the insert member to prevent lateral movement of the insert member between the facing surfaces.

13. The replaceable vise jaw insert assembly of claim 12 wherein the insert member has surfaces which overlap and generally mate with surfaces on the clamping member and vise jaw opposite the base portion of the mill vise.

14. A replaceable vise jaw insert assembly adapted for mounting on a vise jaw arranged on a base portion of a mill vise or the like, comprising a clamping member adapted for attachment to the vise jaw by means of two threaded members, the vise jaw and clamping member being formed with facing surfaces extending upwardly and toward each other from the base surface portion of the mill vise and an insert member having a wedge-shaped portion configured for generally mating engagement with the facing surfaces of the clamping member and vise jaw to provide for capture of the wedge-shaped portion between the clamping member and vise jaw, the insert member being formed with a gripping surface for securing a workpiece on the mill vise.

15. The replaceable vise jaw insert assembly of claim 14 wherein the insert member is extruded, the gripping surface and wedge-shaped portion of the insert member being formed by extrusion.

16. The replaceable vise jaw insert assembly of claim 15 wherein the extruded insert member is cut to a predetermined length with slotted openings being formed in the insert member transverse to its axis of extrusion for receiving the threaded members whereby the threaded members prevent lateral movement of the insert member.

17. An insert member adapted for replaceable mounting on a mill vise or the like between a vise jaw and a clamping member, the insert member comprising a wedge-shaped portion configured for generally mating engagement between spaced apart and relatively inclined facing surfaces of the vise jaw and clamping member, the insert member also comprising a portion arranged to overlap the clamping member, the overlapping portion forming a gripping surface for securing a workpiece on the mill vise.

18. The insert member of claim 17 wherein the facing surfaces of the clamping member and vise jaw inclined upwardly and toward each other relative to a base surface portion of the mill vise, opposite surfaces on the wedge-shaped portion of the insert member being similarly configured to facilitate replaceable trapping of the insert member between the vise jaw and clamping member.

19. The insert member of claim 18 wherein the insert member is extruded, the gripping surface and wedge-shaped portion of the insert member being formed by extrusion.

20. The insert member of claim 19 wherein the extruded insert member is cut to a predetermind length with slotted openings being formed transversely through its wedge-shaped portion for receiving connecting means for the clamping member and vise jaw, the connecting means thereby preventing lateral movement of the insert member.

* * * * *